Feb. 6, 1962 G. D. HULST 3,020,481
REFLECTED BINARY CODE COUNTER
Filed Nov. 15, 1957 2 Sheets-Sheet 1

| | | | | | | | | | | | | | | | | | | | | | |
|---|---|---|---|---|---|---|---|---|---|---|---|---|---|---|---|---|---|---|---|---|---|
| COUNT | 0 | 1 | 2 | 3 | 4 | 5 | 6 | 7 | 8 | 9 | 10 | 11 | 12 | 13 | 14 | 15 | 16 | 17 | 18 | 19 | 20 |
| CONTROL STAGE | 1 | 0 | 1 | 0 | 1 | 0 | 1 | 0 | 1 | 0 | 1 | 0 | 1 | 0 | 1 | 0 | 1 | 0 | 1 | 0 | 1 |
| STAGE #1 | 0 | 1 | 1 | 0 | 0 | 1 | 1 | 0 | 0 | 1 | 1 | 0 | 0 | 1 | 1 | 0 | 0 | 1 | 1 | 0 | 0 |
| STAGE #2 | 0 | 0 | 1 | 1 | 1 | 1 | 0 | 0 | 0 | 0 | 1 | 1 | 1 | 1 | 0 | 0 | 0 | 0 | 1 | 1 | 1 |
| STAGE #3 | 0 | 0 | 0 | 0 | 1 | 1 | 1 | 1 | 1 | 1 | 1 | 1 | 0 | 0 | 0 | 0 | 0 | 0 | 0 | 0 | 1 |
| STAGE #4 | 0 | 0 | 0 | 0 | 0 | 0 | 0 | 0 | 1 | 1 | 1 | 1 | 1 | 1 | 1 | 1 | 1 | 1 | 1 | 1 | 1 |
| STAGE #5 | 0 | 0 | 0 | 0 | 0 | 0 | 0 | 0 | 0 | 0 | 0 | 0 | 0 | 0 | 0 | 0 | 1 | 1 | 1 | 1 | 1 |

Inventor
GEORGE D. HULST
By Philip M. Bolton
Attorney

Feb. 6, 1962 G. D. HULST 3,020,481

REFLECTED BINARY CODE COUNTER

Filed Nov. 15, 1957

2 Sheets-Sheet 2

Inventor
GEORGE D. HULST
By Philip M. Bolton
Attorney

United States Patent Office 3,020,481
Patented Feb. 6, 1962

3,020,481
REFLECTED BINARY CODE COUNTER

George D. Hulst, Verona, N.J., assignor to International Telephone and Telegraph Corporation, Nutley, N.J., a corporation of Maryland Filed Nov. 15, 1957, Ser. No. 696,793
5 Claims. (Cl. 328—42)

This invention relates to data processing systems and in particular to an electrical pulse counting device for counting electrical pulses and representing them electrically according to a reflected binary code.

In the data processing art there are numerous binary codes used. The most popular of these weighted codes is the four bit code wherein the first binary device has a weight of 1, the second a weight of 2, the third a weight of 4 and the last a weight of 8. Many weighted four bit codes and non-weighted codes are described in chapter 6 of the text "Arithmetic Operations in Digital Computers," by R. K. Richards, published by D. Van Nostrand Company, 1955.

One of the code systems which has advantageous features for high speed operations is a "reflected binary code." The outstanding feature of a reflected binary code is that the representation of successive integers differ one from the next by only one digit.

The reflected binary code is sometimes called the "minimum error binary code," because the transition of one bit at a time to advance the count from one number to the next minimizes the possible errors. A table of a reflected binary code is shown in the drawings.

It is an object of this invention to provide an improved electrical pulse counter.

It is a further object of this invention to provide an electrical pulse counter which counts electrical pulses and represents them in a reflected binary code.

It is a further object of this invention to provide an electrical pulse counter which advances one integer to the next, in direct response to the pulses being counted, and not as a secondary response through a change in the respective conditions of the series of binary devices in cascade-connected form.

In accordance with a main feature of the present invention there is provided a plurality of bistable devices, each representing a stage of the counter, coupled together according to a logic circuitry which changes the overall condition of the counter stages in response to the pulses being counted according to a reflected binary code.

According to another main feature of the present invention there is provided a plurality of "and" gates, each assigned to a bistable device counter stage and circuitry arranged to permit the input pulse to transfer the proper single bistable stage, in accordance with a number advancement of the reflected code.

The foregoing and other objects and features of this invention and the manner of attaining them will become more apparent and the invention itself will be best understood by reference to the following description of an embodiment of the invention taken in conjunction with the accompanying drawings comprising FIGS. 1, 2 and 3, wherein.

Figures 1, 2:
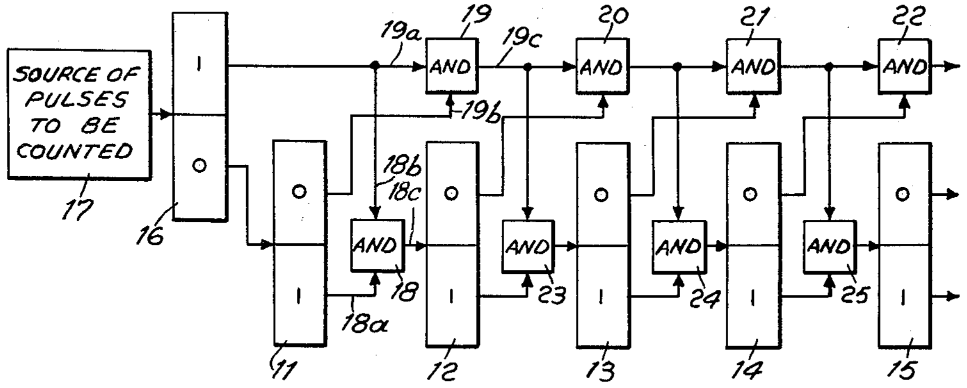
FIG. 1 is a table of a reflected binary code.
FIG. 2 is a block diagram of the reflected binary code counter.

Referring to FIG. 2 there is a plurality of bistable devices 11, 12, 13, 14 and 15 each representing a stage of the counter. A control stage bistable device 16 has its input means coupled to the source of pulses to be counted 17 and the output from its second state of conduction coupled to the input of the first stage bistable device 11. The "and" gate 18 associated with the second stage bistable device 12 has two input means at 18*a* and 18*b* respectively coupled to the first state of conduction output of the first stage bistable device 11 and the first state of conduction output of the control stage bistable device 16. The "and" gate 18 output means 18*c* is coupled to the input of the second stage bistable device 12. A second "and" gate 19 also associated with the second stage bistable device 12 has its two input means 19*a* and 19*b* respectively coupled to the first state of conduction output of the control stage bistable device 16 and the second state of conduction output of the first stage bistable device 11. The "and" gates 20, 21 and 22 are connected in a fashion similar to the "and" gate 19. The input means of each of these last-mentioned "and" gates are analogous to the input means 19*a*, which as described above is connected to the first state of conduction means of the control stage but are each connected respectively to the output means of the "and" gate associated with a preceding stage. For instance, the output means 19*c* of the "and" gate 19 is connected to the input means of the "and" gate 20. The "and" gates 23, 24 and 25 are connected similarly to the "and" gate 18, each having one of their input means connected to the first state of conduction output means of the preceding stage and having the other input means connected to the output means of their associated "and" gates 19, 20, 21 and 22. The output means of each of the "and" gates 23, 24 and 25 are respectively coupled to the input means of their respective associated counter stage bistable devices 13, 14 and 15.

Referring in particular to FIG. 2 for the circuit operation let us assume that the five stages of the counter 11, 12, 13, 14 and 15 are conducting in their respective "0" conditions. Let the control stage 16 be conducting in the "1" condition. According to FIG. 1 the count being zero the stages 11 through 15 are conducting in the "0" condition. From the input pulse source 17 a pulse to be counted is passed to the control stage 16 which causes this control stage to transfer conduction to the "0" side. The transfer of the control stage to the "0" side causes the first stage 11 to transfer to the "1" side. The counter now reads 10,000 which according to FIG. 1 represents the count No. 1. As a second pulse is passed from the source 17 the control stage 16 which was conducting on the "0" side is transferred to the "1" side. In accordance with well-known "flip-flop" operations the transfer of the control stage to the "1" side causes no change of the bistable device 11 and therefore the "and" gate 18 is conditioned by the output from the "1" side of control stage 16 and the "1" side of the first stage 11 to send a pulse to the second stage 12. The counter now reads 11000 which according to FIG. 1 represents the count No. 2. A third pulse from the source 17 causes the control stage 16 to transfer to the "0" side which in turn causes the first stage 11 to transfer to the "0" side. An examination on the "0" side and the control stage conducting on the "0" side none of the "and" gates will be conditioned to give a change, therefore the counter reads 01000 which according to FIG. 1 represents the count No. 3.

As the pulses are received from the source 17, the counter will continue to accumulate these pulses and represent them according to the reflected binary code of FIG. 1. By arranging the "and" gates 19, 20, 21 and 22, as shown in FIG. 2, the bistable device which must be transferred in order to advance the counter by one digit or count is affected directly by the input pulse and the system does not have to depend upon transferring any previous stages in order to affect the proper stage. In other words, in the usual four-bit weighted code systems 1, 2, 4 and 8, as described above, if there is a number seven in the counter, the bistable devices 1, 2 and 4 are conducting on the "1" side. The next pulse into the counter would be the eighth pulse and the counter is designed to read this eighth pulse by having only the weighted 8 bistable device conducting on the "1" side. In this last described system when the eighth pulse is received the weighted 1 bistable device is transferred to its "0" side, which causes the weighted 2 bistable device to be transferred to its "0" side, which in turn causes the weighted 4 bistable device to be transferred to its "0" side, which lastly causes the weighted 8 bistable device to be transferred to its "1" side.

This transition operation in a capacitance coupled bistable multivibrator or flip flop involves the charging of a pair of condensers, one each of which is associated with the respective control elements of the flip flops. The difference in discharge time of these respective condensers causes the transition of the flip flop, since the control element of the side which was cut off reaches the cut off potential value, while going in a positive direction, first; hence causing that side to now conduct. From the above discussion it is obvious that the transition of the flip flop involves a charging and discharging operation for each transition and, therefore to transfer the usual cascaded binary counter from, for instance, 15 to 16 means a charging and discharging operation for four stages before the fifth stage is affected. This chain reaction is a loss of time and in high speed operations undesirable.

In the present invention there is no such necessary reliance on the transfer of previous stages. This is true for two reasons. First, the reflected binary code is inherently designed to transfer only one bit at a time and secondly by use of the "and" gates 19, 20, 21 and 22, the circuit is arranged to have the pulse passed directly from the control stage through to the one bit or stage which is to be altered in accordance with the code. For instance, if the counter represented the count eleven, the counter would be at 01110. The twelfth pulse would transfer the control stage to the "1" side. With the control stage conducting on the "1" side, the "and" gate 19 would be conditioned "on" and the "and" gate 23 would be conditioned "on" to transfer the third stage 13 to the zero side. The third stage 13 would not have to depend on a transferal of the first stage 11 by a transferal of the second stage 12 to accomplish a transferal of the third stage 13. In like fashion the "and" gates 24 and 25 are conditioned "on" when the stages preceding the stage whose "1" condition affects them are reading zero and the control stage is conducting on the "1" side.

Since it is likely that sometime in a high speed computer operation the counter will be read during a transition of the counter from one number to the next. The present invention has the clear advantage that if an error should occur because of this readout during transition, the error can only be in the order of one. Consider, for instance, that the usual cascaded counter is having a transition from the number 15 to 16 and at the point where the first three stages have been transferred or the counter has subtracted 7 there is a readout. The number which would be read out would be the number 8. If a similar situation occurred while using the present invention the number to be read out would still be 15 or an error of 1. The transition in this cited example when using the present invention usually is in the beginning of the chain and the chances of a transitional readout error are reduced.

Figure 3:
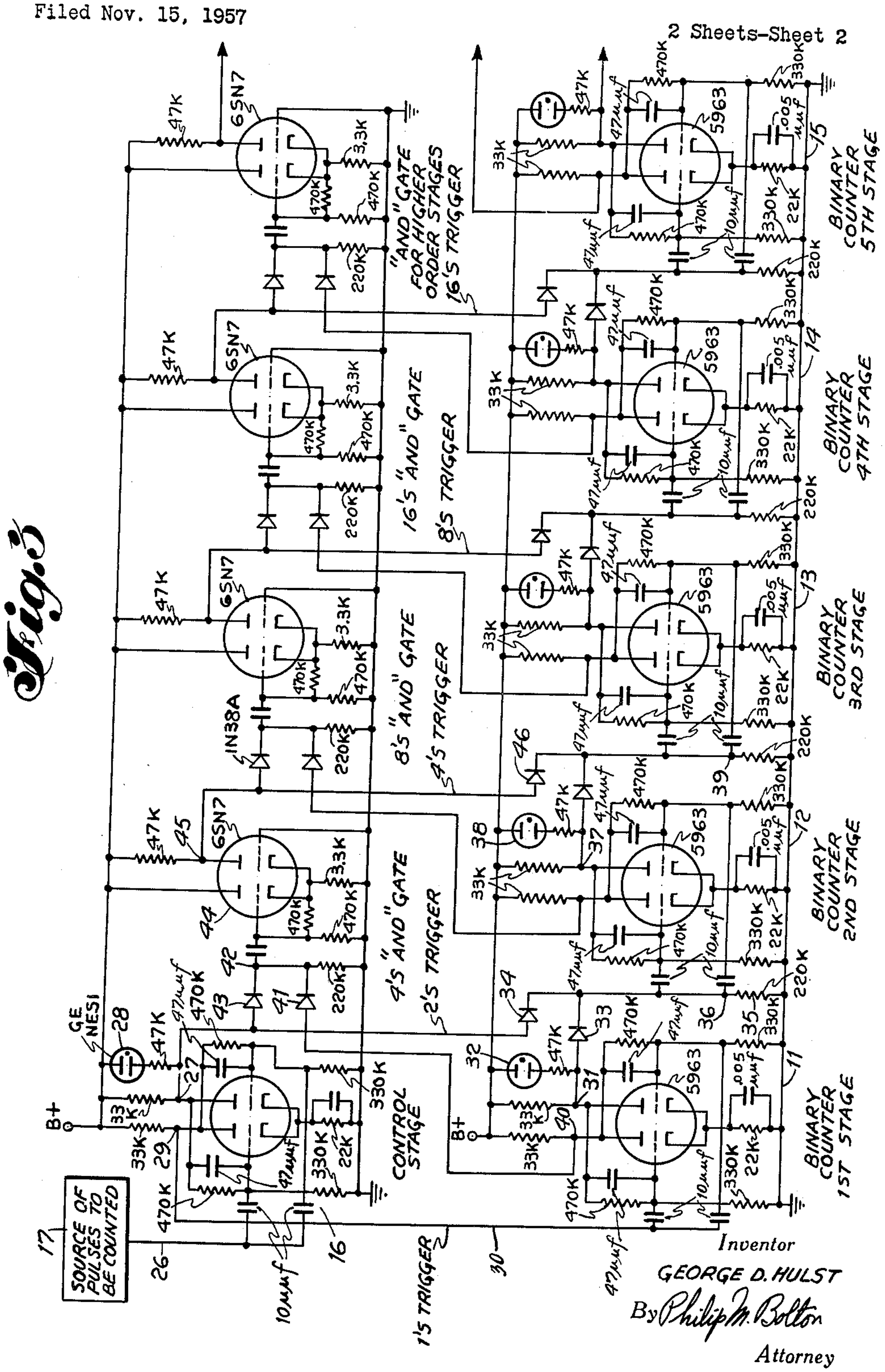
FIG. 3 is a schematic of FIG. 2.

FIG. 3 shows a schematic of FIG. 2. The circuit shown by FIG. 3 is a tested and operative circuit with the component values as shown. Although in FIG. 3 there are shown the usual double triodes capacitance coupled through double triode "and" gates, it is clear that proper transistor circuits or semiconductor circuits might be used.

Referring specifically to FIG. 3 the identification numbers for identical components of FIG. 2 have been retained. The source of pulses to be counted is shown at 17 which is identical to the box shown on FIG. 2. The pulses are passed to the control stage 16 by means of the electrical connection 26. Let us assume that if the double triodes shown for the five stages 11, 12, 13, 14 and 15 and the control stage 16 are conducting on the right hand side that they will be conducting on the "1" side, and if they are conducting on the left hand side they will be conducting on the "0" side. If the double triode of the control stage 16 is conducting on the right hand side, a negative pulse passed through the capacitive coupling to said control stage will cause the control stage 16 to conduct on the "0" side. This transfer of conducting stages is in keeping with the operation of the well-known Eccles-Jordan circuit, or "flip-flop" circuit, the operation of which is described in many texts; one such is the text "Radio Engineering," third edition, by F. E. Terman, published by McGraw-Hill, 1947. With the control stage 16 conducting on the "0" side, point 27 has a positive potential and therefore the neon light 28 is not illuminated. Simultaneously, with the control stage 16 conducting on the "0" side, point 29 has had a negative shift of potential which effectively transfers a negative pulse by means of the electrical connection 30 to the first stage 11. The first stage 11 which had been conducting on the "0" side is transferred and caused to conduct on the "1" side. With the first stage 11 conducting on the "1" side, the point 31 has a negative potential relative to B+ and therefore the neon light 32 is illuminated. With the point 31 at a negative potential there will be no electron flow through the diode 33 and hence one conditioning leg of the "and" gate which is represented in FIG. 2 as 18 and which in FIG. 3 is made up of the two diodes 33 and 34 and the resistance 35, is conditioned "on." When the next pulse is passed from 17 along 26 the control stage is transferred to conduct on the "1" side. This causes the point 27 to have a negative potential relative to B+ and hence causes the neon light 28 to be illuminated. With the point 27 having a negative potential there is no electron flow through the diode 34 and hence the point 36 which represents the output of the "and" gate described above will experience a negative potential shift which will cause the second stage 12 to "flip" and conduct on the "1" side. The transfer of the control stage from its "0" side to its "1" side did not effect the first stage 11 because point 29 experienced a positive potential shift and the capacitance coupling of the flip flops in this circuit make them responsive only to a negative shift. With the second stage 12 conducting on the "1" side the point 37 will have a negative potential in respect to B+ causing the neon light 38 to illuminate and conditioning one leg of the "and" gate whose output is at 39. The third pulse received from 17 will transfer the control stage to conduct on its "0" side which will transfer the first stage to conduct on its "0" side. With the first stage conducting on its zero side the point 40 will have a negative potential relative to B+ which will terminate electron flow through the diode 41 and condition one leg of a second "and" gate whose output is at 42. When the fourth pulse to be counted is received from 17, the control stage returns to conduct on its "1" side. With the control stage conducting on its "1" side, the point 27 having a negative potential terminates electron flow through the diode 43 and effects a negative potential shift or pulse to the double triode 44. This last-mentioned negative potential shift causes the double triode 44 to conduct on its right hand side causing the point 45 to have a negative potential relative to B+. The negative potential at 45 terminates the electron flow through the diode 46 causing a negative shift of potential at 39, since, as described before, the negative potential at 37 had conditioned the other leg of a third "and" gate. The negative shift of potential at 39 causes the third stage 13 to flip and conduct on the "1" side. With the reception of the fourth pulse, we find that the second stage 12 and the third stage 13 are conducting on their respective "1" sides and from FIG. 1 we find that this condition represents the number 4. The operation of the counter continues as described above and more stages may be added to carry the count to any desired number.

The logic circuitry of the present invention might be accomplished by assigning an "and" gate to each stage, which would require progressively more points of conditioning as the counter stage value was increased. To be specific, for a normal four stage counter the "and" gate assigned to the second stage would have two conditions to make it operative, the "and" gate assigned to the third stage would have three conditions to make it operative, while the "and" gate assigned to the fourth stage would have four conditions to make it operative, etc. The circuit of the present invention has the advantage that the "and" gate circuitry is uniform and simple having each "and" gate necessarily responsive to only two conditions.

While I have described above the principles of my invention in connection with specific apparatus, it is to be clearly understood that this description is made only by way of example and not as a limitation to the scope of my invention as set forth in the objects thereof and in the accompanying claims.

I claim:

1. An electrical pulse counter having a plurality of stages comprising a plurality of bistable electron conducting devices, each of said stages including one of said bistable devices, each bistable device having an input means and providing first and second states of conduction alternately responsive to pulses received at said input means, a source of pulses to be counted, one of said bistable devices coupled to said source of pulses to serve as a control stage, the bistable device representing the first stage of said counter having its input means coupled to said control stage, and a plurality of coincident circuits each having first and second input means and one output means coupled between the counter stages, said counter stages being alike and said control stage having in its output circuit "And" gates connected in series, each successive stage of the counter being coupled to one series "And" gate respectively of the control circuit.

2. The pulse counter of claim 1, wherein each series "And" circuit is provided with two inputs, one being associated with the control circuit and the other being connected to a counter stage output respectively.

3. The pulse counter of claim 1, wherein some of said coincident circuits comprise "And" gate circuits coupled between each of the pulse counter stages, each latter "And" gate circuit having only two inputs; one being coupled to a corresponding "And" gate of the control stage, and the other being coupled to a counter stage.

4. An electrical pulse counter having a plurality of stages comprising a plurality of bistable electron conducting devices, each of said stages including one of said bistable devices, each bistable device having input means and first and second output means, said first and second output means being respectively responsive to first and second states of conduction which are produced alternately in response to pulses received at said input means, a source of pulses to be counted, one of said bistable devices coupled to said source of pulses to serve as a control stage, the bistable device representing the first stage of said counter having its input means coupled to be responsive to said second state of conduction of said control stage, a plurality of coincident circuit means each having first and second input means and one output means, each of said bistable devices of said counter stages excluding the first stage being alike and having a first and second of said coincident circuit means associated therewith, each of the first of said associated coincident circuits having its first input means serially coupled to the output means of the first coincident circuit associated with the previous stage, said first coincident circuit associated with the second stage having its first input means coupled to the first output means of said control stage, each of the first coincident circuits respectively having its second input means coupled to the second output means of the bistable device of the stage preceding its associated stage, each of the second coincident circuits having its first input means coupled to the first output means of the bistable device of the stage preceding its associated stage, each of the second coincident circuits further having its second input means coupled to the first input means of its associated first coincident means, and each of the second coincident circuit means having its output means coupled to the respective input means of its associated bistable device.

5. An electrical pulse counter having a plurality of stages comprising a source of pulses to be counted, a bistable control stage multivibrator whose input means is coupled to said source, a plurality of identical counter stages having bistable multivibrators, said first counter stage multivibrator having its input means coupled to a second state of conduction output means of said control multivibrator, a plurality of gate circuit means, a first and second gate circuit means associated with each stage of said counter excluding said first stage, each respective first gate means coupled to be responsive through the first gating means associated with the preceding stage to the first state of conduction of said control multivibrator and the second state of conduction of said preceding stage multivibrator, each of said second gating means excluding the one associated with the second stage coupled to be responsive to the first gating means associated with the preceding stage and the first state of conduction of the multivibrator of the preceding stage, said second gating means associated with said second stage coupled to be responsive to the first state of conduction of both said control stage multivibrator and said first stage multivibrator, and each of said second gating means having its output coupled to the input of its associated bistable multivibrator.

References Cited in the file of this patent

UNITED STATES PATENTS 2,816,223 Nelson ---------------- Dec. 10, 1957

FOREIGN PATENTS 975,941 France ---------------- Oct. 17, 1950

OTHER REFERENCES

Fischmann: "A Gray Coade Counter," IRE Transactions on Electronic Computers, June 1957, page 120.